UNITED STATES PATENT OFFICE.

JESSE H. LEFTWICH, OF CHICAGO, ILLINOIS.

ART OF TREATING MOLASSES AND PRODUCT RESULTING THEREFROM.

No Drawing.    Application filed May 31, 1924.    Serial No. 716,957.

In its primary aspect the invention resides in a novel process for advantageously affecting the tinctorial or color-imparting qualities of low grade or final by-product molasses, particularly in respect to its coloring effect upon herbaceous materials commonly used in prepared stock feed. In addition to this, however, the invention includes the products resulting from the process and in which the advantages derived from the process are utilized.

The general purpose of the invention is the economical production of an improved molasses, suitable for certain alimentary uses, which will not discolor various food commodities upon which it may be used.

A corollary object is the production of an improved stock feed of the type in which molasses is employed as a constituent, and in which the natural colors of the herbaceous and cereal components are preserved.

Recent years have witnessed a very decided increase in the use of so-called mixed feeds for the feeding of live stock. The feed milling industry uses great quantities of the lower grade molasses, such as black strap and beet molasses, in the preparation of such feeds, as it forms an ingredient in almost all of them. As a result, the mixed feed industry now constitutes one of the most important markets for molasses of such grade. While, as stated, the use of molasses in mixed feed is quite general, probably the greatest quantity is used in the manufacture of horse and mule feeds. As known in commerce, these prepared feeds, which are put out under various proprietary names, include, in the aggregate, a considerable variety and number of ingredients. For the most part, however, they comprise corn, oats, alfalfa and molasses, with the alfalfa and molasses present in substantially larger percentages than the oats or corn. These mixed feeds have many recognized advantages which need not be detailed here, and have come to be quite generally used, especially where horses and mules are fed in large numbers.

One of the problems of this industry has been to prepare a feed, which, while containing a substantial quantity of molasses, still will retain the original color appearance of the oats and corn and especially of the green alfalfa. Various efforts in this direction have developed the knowledge that beet molasses, as a rule, has materially less coloring influence on the other constituents of the feed, than has cane molasses. As a result beet molasses commands a higher price from the feed trade than does cane molasses although its feeding value probably is no greater. Efforts have been made to decolorize the low grade cane molasses with the object of decreasing its undesirable darkening effect on the alfalfa, but, so far as I can ascertain, none of these efforts has met with any substantial degree of success, within the demands of economic production and practice on a commercial scale. My present invention attains an effective solution of the problem, and thereby affords an improved feed and an increase in the marketability and utilization of low grade cane molasses.

The nature of the invention may best be demonstrated by an illustrative example of the process for treatment of the molasses, and to that end such an example is herein described. It is to be understood however that I do not regard the invention as limited to the particular practice illustrated in the example, as it will be quite readily recognized by those skilled in the art that different and equivalent agents may be utilized, and that different conditions will demand variations in the practice, all accommodated within the scope and spirit of what I claim as my invention.

It may be stated that, in a general way, the invention contemplates the treatment of the low grade or final by-product molasses, such as is commonly known as blackstrap molasses, with an actively adsorptive material, such as carbon in a very finely divided form, and without the necessity of subsequent removal of the treating agent. While it is well known that dark sugar liquors can be bleached by the use of prepared chars which absorb the coloring materials, it has been regarded as essential that the decolorizing agents then be removed by filtration or other additional treatment, such as to leave behind a light colored residue, which then may be evaporated to the desired consistency. Since carbon in finely divided form is universally recognized as an effective black pigment, it would appear obvious that the mere addition of decolorizing carbon to a dark colored molasses could not possibly have any effect in lightening or lessening the coloring effect of the mixture on such articles as green alfalfa meal. I have discovered however that a state of facts exists which is directly contrary to that which would be reasonably expected, and that when a dark colored molasses is treated with a decolorizing carbon as contemplated by my invention, the actual tinctorial power of the mixture is substantially less than that of the molasses in its original condition, even though the carbon is not removed from the molasses.

The following constitutes an example of an effective procedure for the practice of my process:

To 8000 gallons of approximately 43° Bé. molasses I add, with stirring, a mixture made up of 300 gallons of water, 250 to 300 pounds of the decolorizing carbon in its finely divided form, and two gallons of phosphoric acid (commercial, 85%). This mixture of water, carbon and acid must be thoroughly mixed with the molasses, as by the use of some efficient stirring apparatus. I then heat the mixture to a temperature of about 175° F. for a period of 30 to 45 minutes, at the end of which time the molasses is ready for storage or shipment or for immediate use in the manufacture of molasses feeds, or other employment. While the use of the acid as above described is found to facilitate the practice and contribute to the effectiveness of the decolorizing carbon, the employment of the acid is not regarded as fundamentally essential. It will be understood also that there are many varieties of decolorizing carbon which can be utilized to like effect, and since it is well known that divers types of decolorizing carbon are most efficient under various conditions of acidity, it will be understood that for the most efficient results, the acidity of the molasses should be adjusted so as to give the optimum hydrogen-ion concentration for the particular decolorizing carbon used. It also will be obvious that the quantity of carbon advisable, as well as the exact details of the process, will vary in relation to the nature and the amount of the colored compounds present in the molasses.

Molasses treated according to my process may be added in substantial quantity and proportion to alfalfa of light green color, without materially changing its green appearance. This is in decided contrast to the effect resulting from the addition of the same quantity of untreated molasses to the green alfalfa, as in such instance the mixture forms a darkened, or brown, dingy looking mass, contrasting most unfavorably, on the standards of an attractive feed, with the green, bright and fresh appearance which may be maintained in mixtures employing molasses which has been treated in accordance with my process. Moreover, the improvement in the molasses which results from treatment in accordance with my process, is permanent, whether the molasses be stored as such and subsequently mixed with the other feed ingredients, or whether it be immediately combined with the other ingredients and packed or stored in the form of the finished feed. In either case the feed made with the molasses thus modified will have and will retain more of the natural green color of the original alfalfa than will feed made with molasses which has not been treated by my process.

What I claim is:

1. A process of improving tinctorial characteristics of low grade or final by-product molasses, comprising the addition permanently to the molasses of decolorizing carbon in finely divided form.

2. A process of improving color imparting characteristics of final by-product molasses comprising the addition permanently to such molasses of adsorptive carbon.

3. A process of reducing the coloring effect of final by-product molasses which comprises the permanent addition of acidulated carbon to such molasses.

4. A process of improving color imparting characteristics of blackstrap molasses comprising the mixing with such molasses of decolorizing carbon in a liquid vehicle, followed by the heating of the mixture.

5. A stock food ingredient comprising final by-product molasses containing an admixture of decolorizing carbon.

6. A stock food ingredient comprising blackstrap molasses containing an admixture of decolorizing carbon in finely divided form.

7. A feed comprising herbaceous material treated with blackstrap molasses having an admixture of decolorizing carbon.

8. The method of preparing a stock feed which comprises admixing decolorizing carbon with final by-product molasses, and applying the mixture to herbaceous material.

In testimony whereof I have hereunto subscribed my name.

JESSE H. LEFTWICH.